US012060212B2

(12) United States Patent
Kang

(10) Patent No.: US 12,060,212 B2
(45) Date of Patent: Aug. 13, 2024

(54) TWO-LIQUID CONTAINER

(71) Applicant: Seong Il Kang, Seongnam (KR)

(72) Inventor: Seong Il Kang, Seongnam (KR)

( * ) Notice: Subject to any disclaimer, the term of this patent is extended or adjusted under 35 U.S.C. 154(b) by 271 days.

(21) Appl. No.: 17/622,080

(22) PCT Filed: Jul. 10, 2020

(86) PCT No.: PCT/KR2020/009099
§ 371 (c)(1),
(2) Date: Dec. 22, 2021

(87) PCT Pub. No.: WO2021/015467
PCT Pub. Date: Jan. 28, 2021

(65) Prior Publication Data
US 2022/0258949 A1 Aug. 18, 2022

(30) Foreign Application Priority Data
Jul. 23, 2019 (KR) ........................ 10-2019-0089115

(51) Int. Cl.
*B65D 81/32* (2006.01)
*A45D 34/04* (2006.01)
(Continued)

(52) U.S. Cl.
CPC ......... *B65D 81/3222* (2013.01); *A45D 34/04* (2013.01); *A45D 40/24* (2013.01);
(Continued)

(58) Field of Classification Search
CPC ............ B65D 81/3222; B65D 47/2018; B65D 51/32; B65D 81/32; B65D 47/06;
(Continued)

(56) References Cited

U.S. PATENT DOCUMENTS 2,822,082 A * 2/1958 Breckwoldt ........... A45D 34/00
206/568
5,875,889 A 3/1999 Albisetti
(Continued)

FOREIGN PATENT DOCUMENTS

FR 3100695 E 3/2021
JP 06-031612 U 4/1994
(Continued)

*Primary Examiner* — Donnell A Long
(74) *Attorney, Agent, or Firm* — Heedong Chae; Lucem, PC

(57) ABSTRACT

A two-liquid container capable of mixing solutions, including a container main body having a storage space in which first contents are stored, and having an upper part and a lower part that are open; a rotational assembly which is coupled to the lower open part of the container main body and in which second contents are stored; and a pipette assembly screwed to a screw thread formed on the outer circumferential surface of the upper open part of the container main body. The present invention exhibits an effect of coupling the rotational assembly filled with the second contents to the lower end of the container main body filled with the first contents so as to facilitate mixing of first and second contents by the rotation the rotational assembly.

5 Claims, 10 Drawing Sheets

(51) Int. Cl.

| | |
|---|---|
| ***A45D 40/24*** | (2006.01) |
| ***B05B 11/00*** | (2023.01) |
| ***B65D 47/20*** | (2006.01) |
| ***B65D 51/32*** | (2006.01) |

(52) U.S. Cl.

CPC ...... *B05B 11/0081* (2013.01); *B65D 47/2018* (2013.01); *B65D 51/32* (2013.01); *A45D 2200/057* (2013.01); *A45D 2200/058* (2013.01)

(58) Field of Classification Search

CPC .. A45D 34/04; A45D 40/24; A45D 2200/057; A45D 2200/058; A45D 34/046; A45D 2200/056; A45D 34/00; A45D 2200/054; A45D 40/00; A45D 2034/002; A45D 2040/0006; B05B 11/0081; B05B 11/1023; B05B 11/1074; B05B 11/0032; B05B 11/1047; B05B 11/1002

See application file for complete search history.

(56) References Cited

U.S. PATENT DOCUMENTS

| | | | | |
|---|---|---|---|---|
| 9,381,480 | B2 * | 7/2016 | Kang | B01F 35/7139 |
| 9,718,073 | B2 * | 8/2017 | Kang | B05B 11/1033 |
| 2010/0236572 | A1 * | 9/2010 | Guenther | A45D 34/02 132/299 |

FOREIGN PATENT DOCUMENTS

| | | | | |
|---|---|---|---|---|
| JP | 06031612 | U | * | 4/1994 |
| KR | 10-1296574 | B1 | | 8/2013 |
| KR | 10-1390993 | B1 | | 5/2014 |
| KR | 20-0473319 | Y1 | | 6/2014 |
| KR | 10-2017-0042019 | A | | 4/2017 |
| KR | 1020170042019 | A | * | 4/2017 |
| WO | 2007120000 | A1 | | 10/2007 |

* cited by examiner

TWO-LIQUID CONTAINER

TECHNICAL FIELD

The present invention relates to a two-liquid container, and more specifically, to a two-liquid container, in which a rotational assembly containing second contents is coupled to a lower end of a container main body containing first contents, so that first and second contents can be easily mixed by rotation of the rotational assembly.

BACKGROUND ART

In general, cosmetics and medicines having new properties may be obtained by mixing medicines of different ingredients among cosmetic materials or medicines of the same series. As an example, there are dyes and oxidizing agents used for dyeing, and liquid and powdery materials used for makeup.

However, although the above medicines exhibit new properties when using the medicines together, there are concerns about deterioration due to differences in ingredients and difficulties in long-term storage when two types of contents are mixed and stored in one container, so that the contents are stored in separate containers, respectively, in manufacture and sales. In addition, consumers need to purchase these containers separately and, if necessary, put the medicines in one container and mix the medicines in use. For this reason, it is necessary to separately manufacture, sell, purchase, and use each container, resulting in inconvenience and discomfort.

However, when mixing the medicines in a separate container, dust, etc. existing in an atmosphere may also be mixed so that there is a risk that the medicines may be easily deteriorated due to a chemical reaction caused by foreign substances. In addition, since the medicines or cosmetic solutions and powders of different properties are stored in each container, there is an inconvenience to mix and use the medicines, and the medicines may be wasted.

DISCLOSURE

Technical Problem

The present invention has been made to address the demands of the prior art, and the present invention provides a two-liquid container, in which a rotational assembly containing second contents is coupled to a lower end of a container main body containing first contents, so that first and second contents can be easily mixed by rotation of the rotational assembly.

Technical Solution

A two-liquid container capable of mixing solutions according to a first embodiment of the present invention includes: a container main body having a storage space in which first contents are stored, and having an upper part and a lower part that are open; a rotational assembly which is coupled to the lower open part of the container main body and in which second contents are stored; and a pipette assembly screw-coupled to a screw thread formed on an outer circumferential surface of the upper open part of the container main body, wherein the pipette assembly includes: a cylindrical member having a cylindrical shape and formed with a female screw coupled to the screw thread of the container main body; a pipette pressure member having an outer circumferential surface fixedly inserted into an inner bent portion (31*b*) that is bent inward at an upper end of the cylindrical member; a pipette pipe inserted into the pipette pressure member (32) to suck or discharge the contents by negative or positive pressure of the pipette pressure member and a wiper member having upper and lower portions that are opened, in which the wiper member is a cylindrical member coupled to an inner circumferential surface of an opening of the container main body, a flange of the wiper member is placed on an upper end of the container main body, and a lower end of the wiper member is bent inward and comes into contact with an outer circumferential surface of the pipette pipe to wipe the contents attached to the pipette pipe.

The rotational assembly may include: a rotary member having a cylindrical shape with an upper part that is open and a lower part that is closed, rotatably coupled to an outer circumferential surface of the lower open part of the container main body, and having a cylindrical screw column protruding from a center of a lower surface of the rotary member; a cylinder which is a cylindrical member having an upper part that is open and a lower part formed with a hole fitted around an outer circumferential surface of the cylindrical screw column in the rotary member, the cylinder being inserted into a lower inner circumferential surface of the container main body; a piston-type valve installed in close contact with an inner circumferential surface of the cylinder and having a lower screw column screw-coupled to the cylindrical screw column protruding from a lower portion of the cylinder; a valve support coupled between the upper open part of the cylinder and the lower open part of the container main body; a disk-shaped valve which is a disk-shaped member coupled to an upper central portion of the valve support and having a plurality of liquid outlet holes formed along a circumferential direction; an opening/closing valve inserted through a lower portion of the valve support to open and close the liquid outlet hole; a valve support rod which is a rod-shaped member for supporting a central lower end of the opening/closing valve and having a latching protrusion formed on an outer portion of a lower end of the valve support rod and fastened to a central lower end surface of the piston-type valve and the cylindrical screw column; and a cylindrical spring interposed between a lower upper surface of the cylinder and a lower surface of the piston-type valve and expanded when a screw coupling between the cylindrical screw column and the lower screw column of the piston-type valve is released to push the piston-type valve upward.

A two-liquid container according to a second embodiment of the present invention includes: a container main body having a storage space in which first contents are stored, and having an upper part and a lower part that are open; a rotational assembly which is coupled to the lower open part of the container main body and in which second contents are stored; and a pipette assembly screw-coupled to a screw thread formed on an outer circumferential surface of the upper open part of the container main body, wherein the rotational assembly includes: a rotary member, which is a cylindrical member with an upper part that is open and a lower part that is closed, rotatably coupled to an outer circumferential surface of the lower open part of the container main body, and having a cylindrical screw column protruding from a center of a lower surface of the rotary member; a valve support, which is a cylindrical member with upper and lower parts that are open, closely coupled to a lower inner circumferential surface of the container main body (10); an opening/closing valve mounted on the upper and lower open parts of the valve support; a cylinder member which is a cylindrical member having upper and lower parts that are open, in which an upper end of the cylinder member closely makes contact with an outer portion of a lower end of the valve support, and an outer protrusion formed at a lower end of the cylinder member is inserted into a lower inner circumferential hole of the container main body; a piston-type valve, which is a disk-shaped member that opens the opening/closing valve while moving upward from an inner circumferential portion of the cylinder member so that the B solution and the A solution are mixed and has a lower screw column screw-coupled to the screw column of the rotary member; and a cylindrical spring inserted into a lower portion of the piston-type valve and expanded when a screw coupling between the cylindrical screw column and the lower screw column of the piston-type valve is released to push the piston-type valve upward.

The opening/closing valve may include: an upper disk seated and fixed on the upper open part of the valve support and formed at a center thereof with a circular hole; a lower disk placed on an upper surface of the lower open part of the valve support; and a plurality of folding connection rods, which are a plurality of members formed at equal intervals to connect between the upper disk and the lower disk, in which the folding connection rods are formed with folded portions, respectively, which are folded when the lower disk moves up.

A two-liquid container according to a third embodiment of the present invention includes: a container main body having a storage space in which an A solution that is a first content is stored, and having an upper part and a lower part that are open; a rotational assembly which is coupled to the lower open part of the container main body and in which a B solution that is a second content is stored; and a pump-type nozzle assembly screw-coupled to a screw thread formed on an outer circumferential surface of the upper open part of the container main body, wherein the rotational assembly includes: a rotary member, which is a cylindrical member with an upper part that is open and a lower part that is closed, rotatably coupled to an outer circumferential surface of the lower open part of the container main body, and having a cylindrical screw column protruding from a center of a lower surface of the rotary member; a cylinder-type valve support member, which is a cylindrical member with upper and lower parts that are open, in which a valve support protrusion is formed on an upper end thereof, and an outer protrusion is formed at a lower end thereof and inserted into a lower inner circumferential hole of the container main body; a piston-type valve, which is a disk-shaped member that moves upward from an inner circumferential portion of the cylinder-type valve support member so that the B solution and the A solution contained therein are mixed and has a lower screw column screw-coupled to the screw column of the rotary member; a cover valve, which is a member with an upper portion having a convex dome-shape coupled to the valve support protrusion of the cylinder-type valve support member, in which cover valve covers an upper portion of the cylinder-type valve support member; and a cylindrical spring inserted into a lower portion of the piston-type valve and expanded when a screw coupling between the cylindrical screw column and the lower screw column of the piston-type valve is released to push the piston-type valve upward.

The rotational assembly may further includes a cover valve connector, in which an upper central protrusion is coupled to a lower end of the cover valve, and a plurality of vertical legs are formed at a lower portion of the cover valve so that the cover valve is separated from the valve support protrusion by the cover valve connector as the piston-type valve moves up.

Advantageous Effects

According to the two-liquid container of the present invention, the rotational assembly containing second contents is coupled to a lower end of the container main body containing first contents, so that the first and second contents can be easily mixed by rotation of the rotational assembly.

BEST MODE

A two-liquid container includes: a container main body having a storage space in which first contents are stored, and having an upper part and a lower part that are open; a rotational assembly which is coupled to the lower open part of the container main body and in which second contents are stored; and a pipette assembly screw-coupled to a screw thread formed on an outer circumferential surface of the upper open part of the container main body, wherein the pipette assembly includes: a cylindrical member having a cylindrical shape and formed with a female screw coupled to the screw thread of the container main body; a pipette pressure member having an outer circumferential surface fixedly inserted into an inner bent portion 31*b* that is bent inward at an upper end of the cylindrical member; a pipette pipe inserted into the pipette pressure member 32 to suck or discharge the contents by negative or positive pressure of the pipette pressure member; and a wiper member having upper and lower portions that are opened, in which the wiper member is a cylindrical member coupled to an inner circumferential surface of an opening of the container main body, a flange of the wiper member is placed on an upper end of the container main body, and a lower end of the wiper member is bent inward and comes into contact with an outer circumferential surface of the pipette pipe to wipe the contents attached to the pipette pipe.

MODE FOR INVENTION

Hereinafter, preferred embodiments of the present invention will be described in detail with reference to the accompanying drawings. In addition, in describing the present invention, if it is determined that a detailed description of a related known configuration or function may obscure the gist of the present invention, the detailed description thereof will be omitted.

First Embodiment

Figure 1:
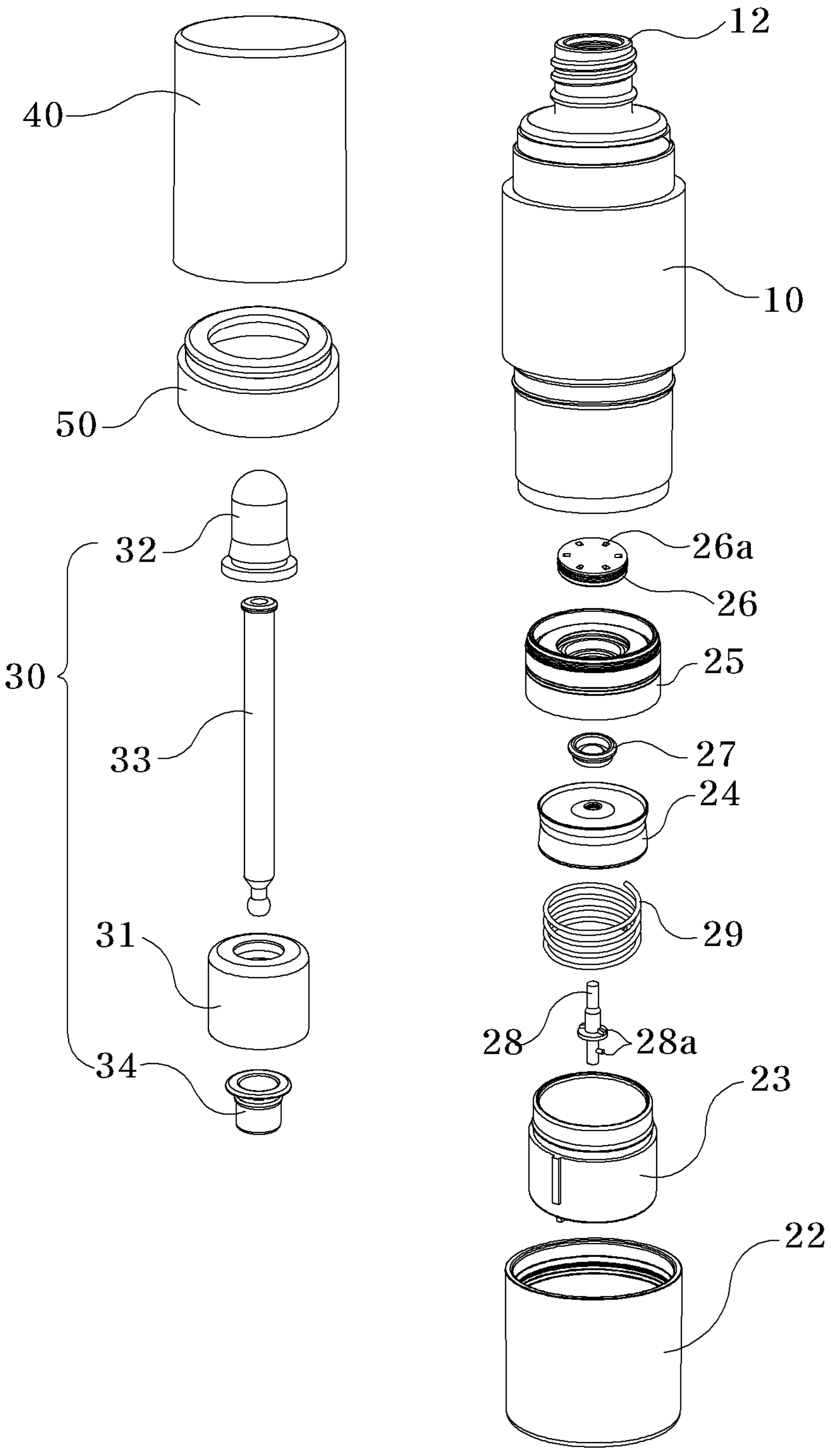
FIG. 1 is an exploded perspective view showing a two-liquid container capable of mixing a solution according to a first embodiment of the present invention.
Figure 2:
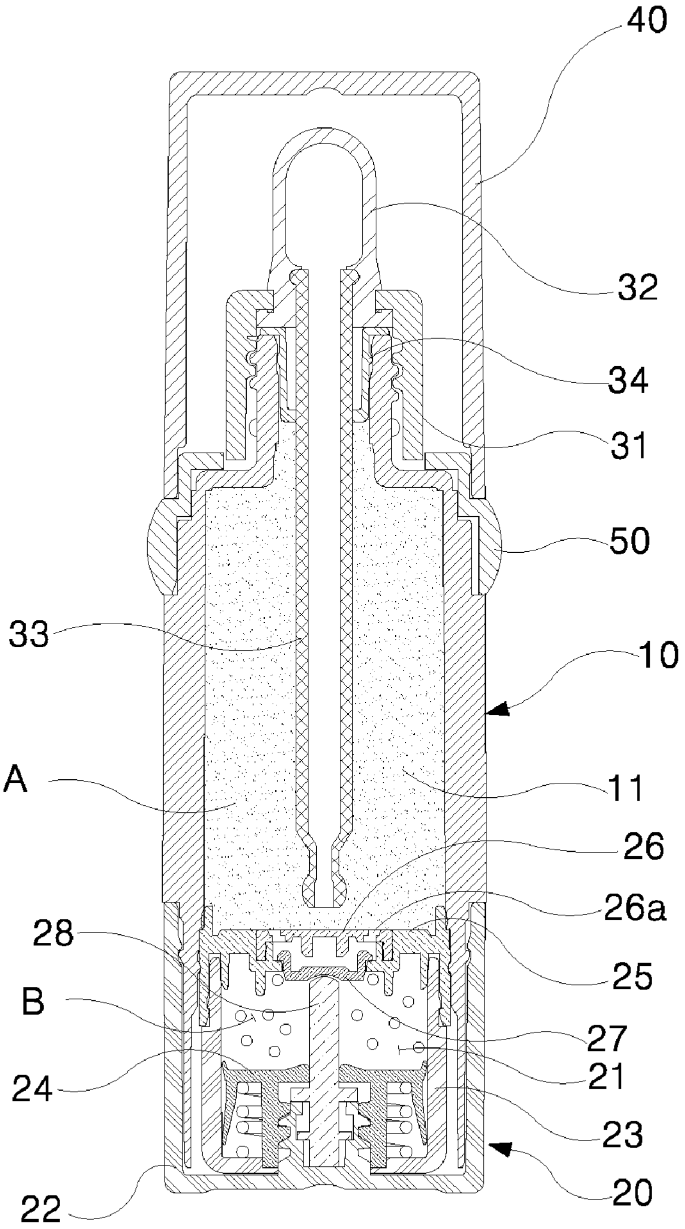
FIG. 2 is an assembled sectional view showing a two-liquid container capable of mixing a solution according to a first embodiment of the present invention.
Figure 3:
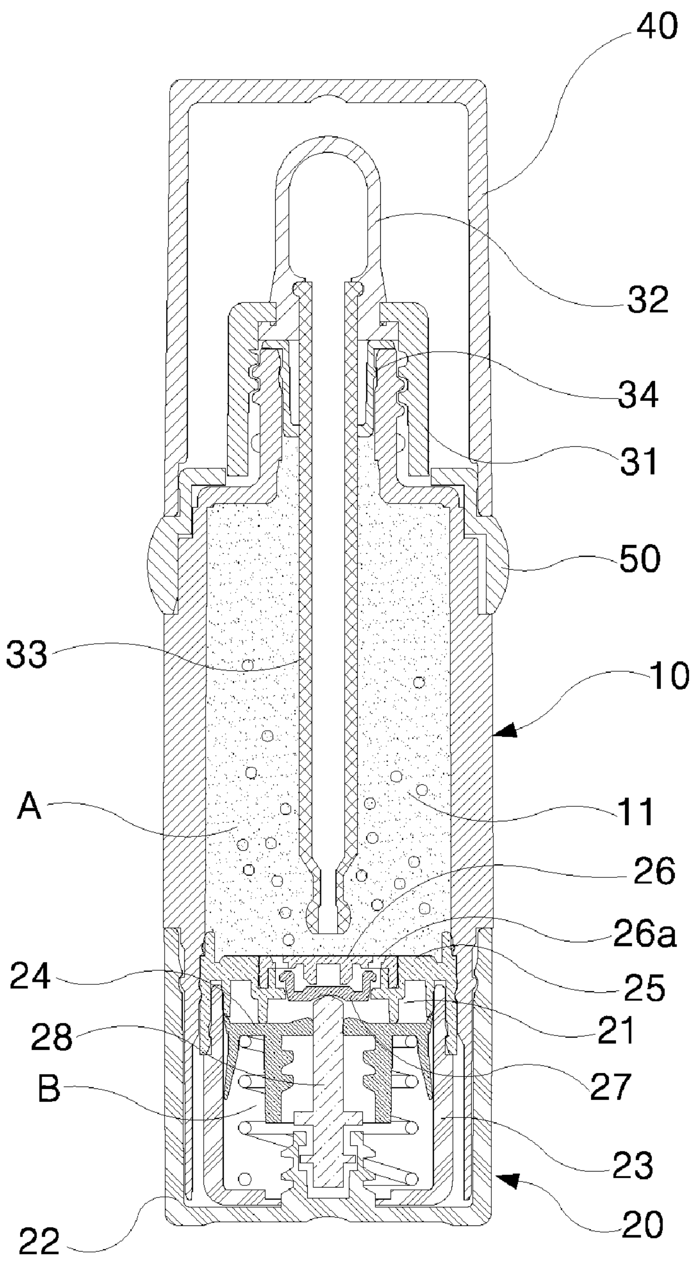
FIG. 3 is an assembled sectional view showing a state in which a two-liquid solution according to a first embodiment of the present invention is mixed.
Figure 4:
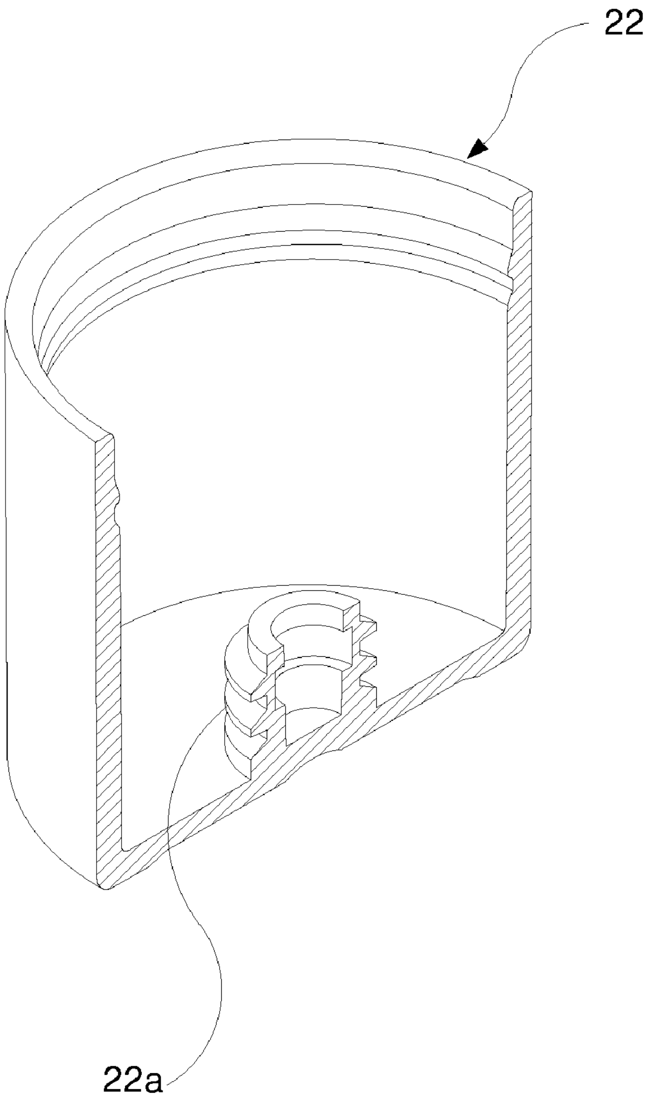
FIG. 4 is a sectional perspective view showing a rotary member according to a first embodiment of the present invention.
Figure 5:
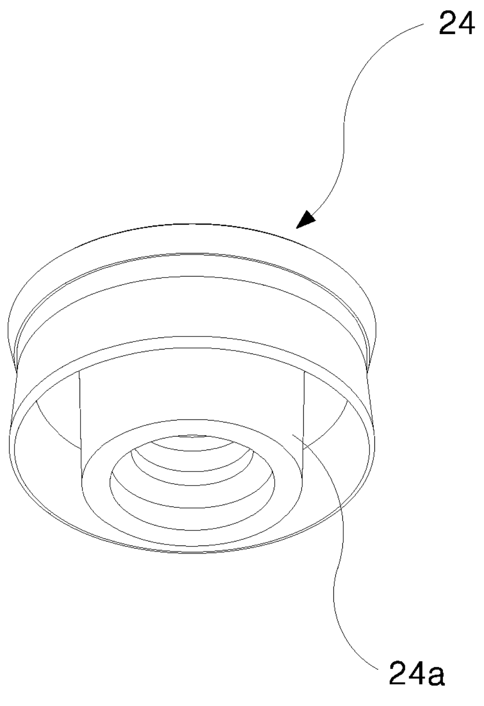
FIG. 5 is a perspective view of a piston-type valve according to a first embodiment of the present invention, which is viewed from the bottom.

FIG. 1 is an exploded perspective view showing a two-liquid container capable of mixing a solution according to a first embodiment of the present invention, FIG. 2 is an assembled sectional view showing a two-liquid container capable of mixing a solution according to a first embodiment of the present invention, FIG. 3 is an assembled sectional view showing a state in which a two-liquid solution according to a first embodiment of the present invention is mixed, FIG. 4 is a sectional perspective view showing a rotary member according to a first embodiment of the present invention, and FIG. 5 is a perspective view of a piston-type valve according to a first embodiment of the present invention, which is viewed from the bottom.

As shown in FIGS. 1 to 5, the two-liquid container according to the first embodiment of the present invention is configured such that at least two types of contents are isolated before use, and then different contents are mixed when opened.

To this end, the two-liquid container may include a container main body 10 having a storage space in which first contents 11 are stored, and having an upper part and a lower part that are open, and a rotational assembly 20 which is coupled to the lower open part of the container main body 10 and in which second contents 21 are stored.

The container main body 10 may be formed at an upper portion thereof with an opening, and a screw thread 12 may be formed on the outer circumferential surface of the opening.

In addition, a pipette assembly 30 may be coupled to the screw thread 12 of the container main body 10.

The pipette assembly 30 may include a cylindrical member 31 having a cylindrical shape and formed with a female screw 31*a* coupled to the screw thread 12 of the container main body 10, a pipette pressure member 32 having an outer circumferential surface fixedly inserted into an inner bent portion 31*b* that is bent inward at an upper end of the cylindrical member 31, a pipette pipe 33 inserted into the pipette pressure member 32 to suck or discharge the contents by negative or positive pressure of the pipette pressure member 32, and a wiper member 34 having upper and lower portions that are opened, in which the wiper member 34 is a cylindrical member coupled to an inner circumferential surface of an opening of the container main body 10, a flange 34*a* of the wiper member 34 is placed on an upper end of the container main body 10, and a lower end of the wiper member 34 is bent inward and comes into contact with an outer circumferential surface of the pipette pipe 33 to wipe the contents attached to the pipette pipe 33.

The rotational assembly 20 include a rotary member 22 having a cylindrical shape with an upper part that is open and a lower part that is closed, rotatably coupled to an outer circumferential surface of the lower open part of the container main body 10, and having a cylindrical screw column 22*a* protruding from a center of a lower surface of the rotary member 22, a cylinder 23 which is a cylindrical member having an upper part that is open and a lower part formed with a hole 23*a* fitted around an outer circumferential surface of the cylindrical screw column 22*a* in the rotary member 22, the cylinder 23 being inserted into a lower inner circumferential surface of the container main body 10; a piston-type valve 24 installed in close contact with an inner circumferential surface of the cylinder 23 and having a lower screw column 24*a* screw-coupled to the cylindrical screw column 22*a* protruding from a lower portion of the cylinder 23, a valve support 25 coupled between the upper open part of the cylinder 23 and the lower open part of the container main body 10, a disk-shaped valve 26 which is a disk-shaped member coupled to an upper central portion of the valve support 25 and having a plurality of liquid outlet holes 26*a* formed along a circumferential direction, an opening/closing valve 27 inserted through a lower portion of the valve support 25 to open and close the liquid outlet hole 26*a*, a valve support rod 28 which is a rod-shaped member for supporting a central lower end of the opening/closing valve 27 and having a latching protrusion 28*a* formed on an outer portion of a lower end of the valve support rod 28 and fastened to a central lower end surface of the piston-type valve 24 and the cylindrical screw column 22*a*, and a cylindrical spring 29 interposed between a lower upper surface of the cylinder 23 and a lower surface of the piston-type valve 24 and expanded when a screw coupling between the cylindrical screw column 22*a* and the lower screw column 24*a* of the piston-type valve 24 is released to push the piston-type valve 24 upward.

On the upper side of the container main body 10, a cover member 40 may be coupled via a shoulder member 50 to cover the pipette assembly 30 inserted into the opening.

Hereinafter, the assembling process of the first embodiment of the present invention configured as described above will be described.

First, the assembling process of the rotational assembly 20 will be explained. The cylinder 23 is inserted through the upper open part of the rotary member 22, and the valve support rod 28 is coupled through a lower portion of the piston-type valve 24. In a state where the cylindrical spring 29 is positioned at the lower portion of the piston-type valve 24, the piston-type valve 24 is rotated while being pressed to screw-couple the screw column 22*a* of the rotary member 22 to the lower screw column 24*a* thereof.

In this assembled state, the second content 21, that is, the liquid B is filled through the upper portion of the cylinder 23, the valve support 25 is inserted into the outer circumferential surface of the upper opening of the cylinder 23, and the opening/closing valve 27 and the disk-shaped valve 26 are sequentially assembled through the central hole of the valve support 25.

The rotational assembly 20 assembled in this way is inserted into the lower portion of the container main body 10. That is, the lower portion of the container main body 10 is inserted into the space between the inner circumferential surface of the rotary member 22 and the outer circumferential surface of the valve support 25.

Then, the liquid A, which is the first content 11, is filled through the upper opening of the container main body 10 assembled on the upper portion of the rotational assembly 20 as described above. The shoulder member 50 is inserted into a shoulder part of the container main body 10, and the pipette assembly 30 is screw coupled to the outer circumferential surface of the opening of the container main body 10, thereby completing the assembling work. In this assembled state, the cover member 40 is provided.

The operation of the two-liquid container capable of mixing the solution, which is assembled as described above, will be described below.

First, in order to mix the liquid A and liquid B, when the rotary member 22 is turned, the screw coupling of the piston-type valve 24 screw coupled to the screw column 22*a* of the rotary member 22 is released so that the compressed cylindrical spring 29 is expanded (FIG. 3). In this way, the cylindrical spring 29 moves up the piston-type valve 24 in the cylinder 23, thereby reducing the space in which the liquid B is stored. Thus, the opening/closing valve 27 moves up to open the central lower hole of the valve support 25, and the liquid B flows out through the liquid outlet hole 26*a* of the disk-shaped valve 26 so that it is mixed with the liquid A in the container main body 10.

In this way, a cosmetic liquid in which the liquid A and liquid B are mixed can be used. The first and second contents 11 and 21 can be easily mixed by rotating the rotary member 22.

Second Embodiment

Figure 6:
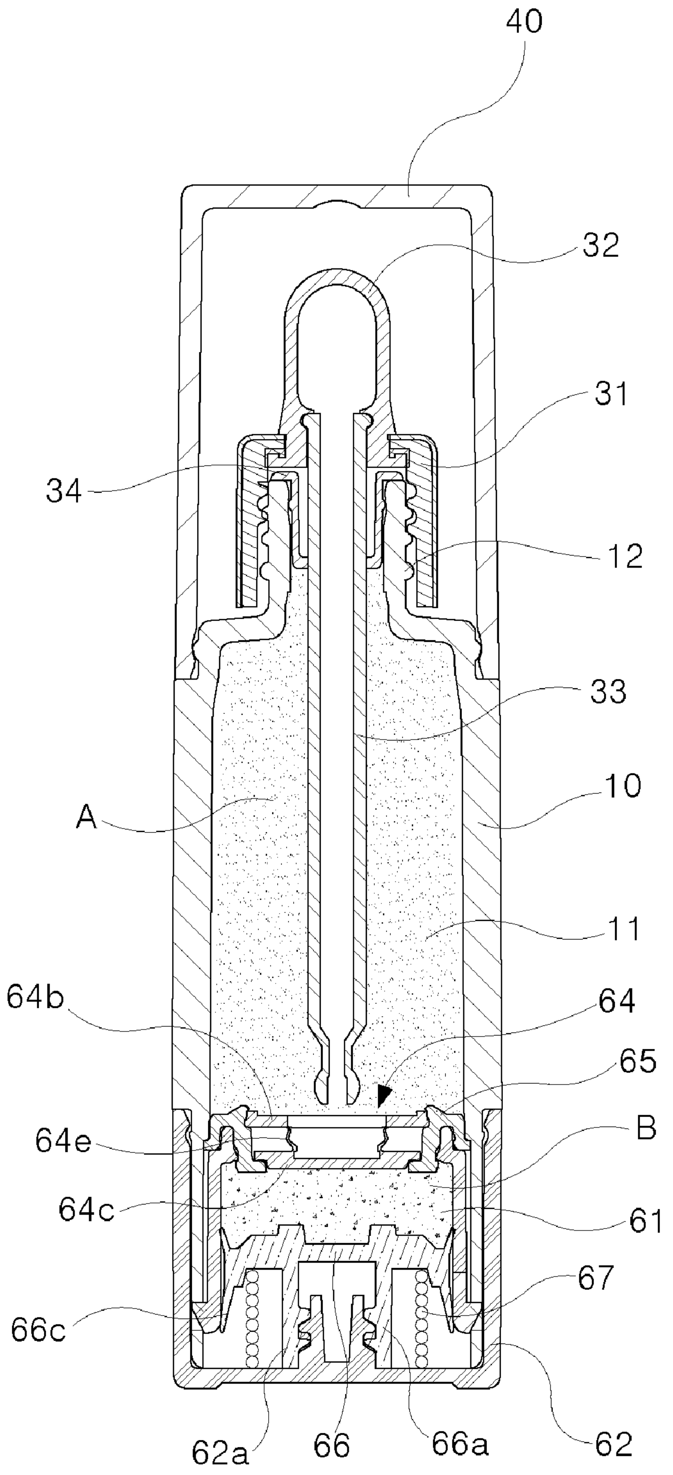
FIG. 6 is an assembled sectional view showing a two-liquid container capable of mixing a solution according to a second embodiment of the present invention.
Figure 7:
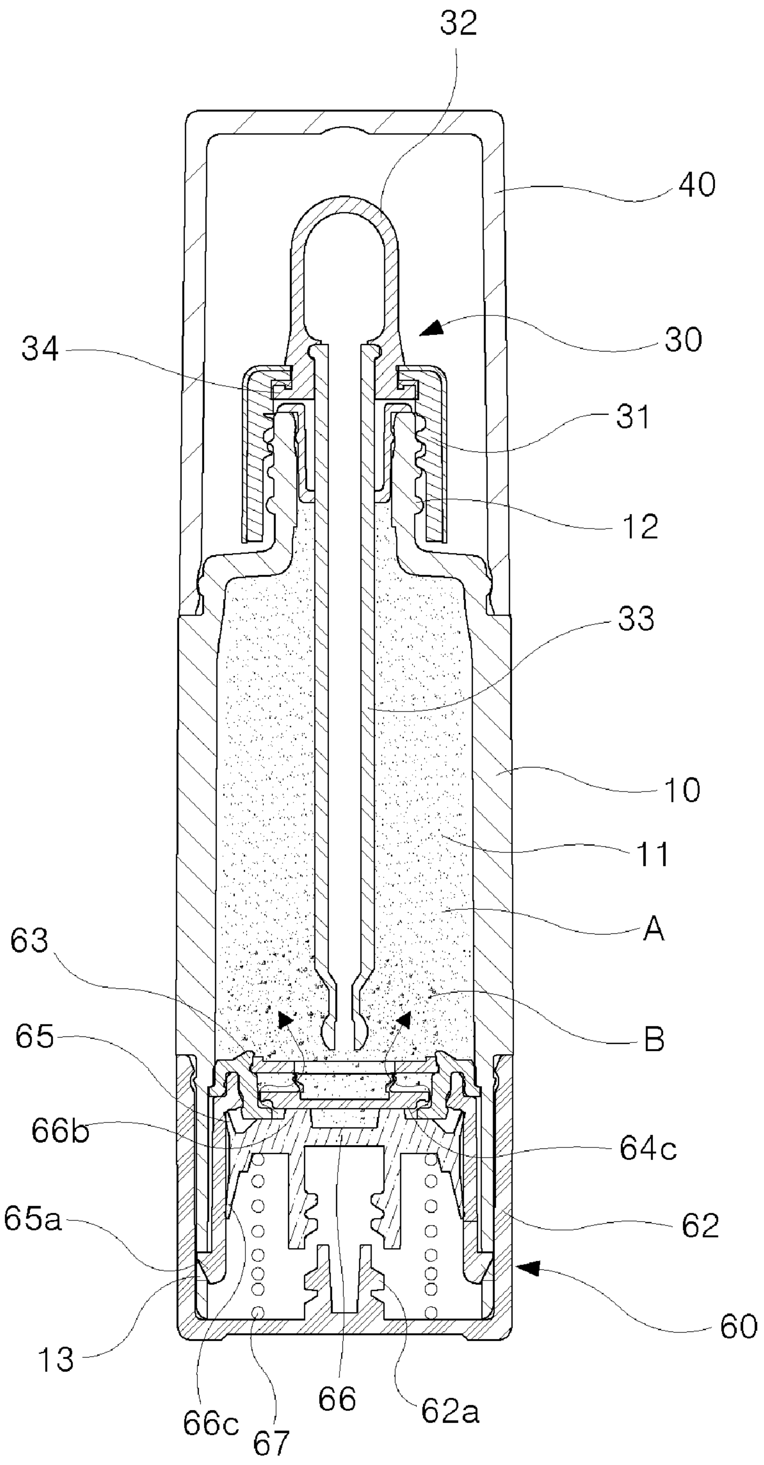
FIG. 7 is an assembled sectional view showing a state in which the two-liquid solution according to a second embodiment of the present invention is mixed.
Figure 8:
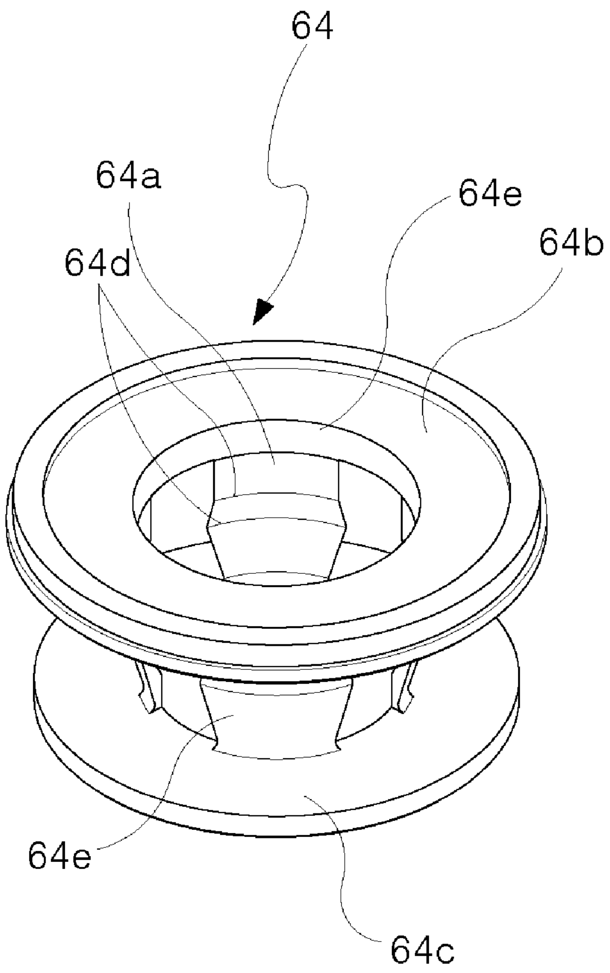
FIG. 8 is a perspective view showing a valve of a two-liquid container according to a second embodiment of the present invention.

FIG. 6 is an assembled sectional view showing a two-liquid container capable of mixing a solution according to a second embodiment of the present invention, FIG. 7 is an assembled sectional view showing a state in which the two-liquid solution according to a second embodiment of the present invention is mixed, and FIG. 8 is a perspective view showing a valve of a two-liquid container according to a second embodiment of the present invention.

As shown in FIGS. 6 to 8, the two-liquid container according to the second embodiment of the present invention is configured such that at least two types of contents are isolated before use, and then different contents are mixed when opened.

To this end, the two-liquid container may include a container main body 10 having a storage space in which first contents 11 are stored, and having an upper part and a lower part that are open, and a rotational assembly 60 which is coupled to the lower open part of the container main body 10 and in which second contents 61 are stored.

The container main body 10 may be formed at an upper portion thereof with an opening and a screw thread 12 may be formed on the outer circumferential surface of the opening.

In addition, the pipette assembly 30 may be coupled to the screw thread 12 of the container main body 10.

Since the pipette assembly 30 is the same as that of the first embodiment, the description thereof will be omitted.

The rotational assembly 60 may include: a rotary member 62, which is a cylindrical member with an upper part that is open and a lower part that is closed, rotatably coupled to an outer circumferential surface of the lower open part of the container main body 10, and having a cylindrical screw column 62*a* protruding from a center of a lower surface of the rotary member 62; a valve support 63, which is a cylindrical member with upper and lower parts that are open, closely coupled to a lower inner circumferential surface of the container main body 10; an opening/closing valve 64 mounted on the upper and lower open parts of the valve support 63; a cylinder member 65 which is a cylindrical member having upper and lower parts that are open, in which an upper end of the cylinder member 65 closely makes contact with an outer portion of a lower end of the valve support 63, and an outer protrusion 65*a* formed at a lower end of the cylinder member 65 is inserted into a lower inner circumferential hole 13 of the container main body 10; a piston-type valve 66, which is a disk-shaped member that opens the opening/closing valve 64 while moving upward from an inner circumferential portion of the cylinder member 65 so that the B solution and the A solution are mixed and has a lower screw column 66*a* screw-coupled to the screw column 62*a* of the rotary member 62; and a cylindrical spring 67 inserted into a lower portion of the piston-type valve 66 and expanded when a screw coupling between the cylindrical screw column 62*a* and the lower screw column 66*a* of the piston-type valve 66 is released to push the piston-type valve 66 upward.

The opening/closing valve 64 may include an upper disk 64*b* seated and fixed on the upper open part of the valve support 63 and formed at a center thereof with a circular hole 64*a*, a lower disk 64*c* placed on an upper surface of the lower open part of the valve support 63, and a plurality of folding connection rods 64*e*, which are a plurality of members formed at equal intervals to connect between the upper disk 64*b* and the lower disk 64*c*, in which the folding connection rods 64*e* are formed with folded portions 64*d*, respectively, which are folded when the lower disk 64*c* moves up.

The piston-type valve 66 may include a plurality of protrusions 66*b* formed on an upper surface of the piston-type valve 66 to push up the lower disk 64*c* of the opening/closing valve 62 when the piston-type valve 66 moves up and a side plate 66*c* formed on an outer circumference of the piston-type valve 66 in close contact with an inner circumference of the cylinder member 65 to push up the liquid B provided thereon.

On the upper side of the container main body 10, a cover member 40 may be coupled via a shoulder member 50 to cover the pipette assembly 30 inserted into the opening.

Hereinafter, the assembling process of the second embodiment of the present invention configured as described above will be described.

First, the assembling process of the rotational assembly 60 will be explained. The piston-type valve 66 is firstly inserted into the inner circumference of the cylinder member 65, the liquid B, which is the second content 61, is filled on the upper surface of the piston-type valve 66, the valve support 63 is inserted into the upper end of the cylinder member 65, and then the opening/closing valve 64 is seated on the upper and lower open parts of the valve support 63.

The assembly, which is assembled as described above, is pushed upward through the lower open part of the container main body 10, and the cylindrical spring 67 is positioned at the lower portion of the piston-type valve 66. Then, the rotary member 62 is coupled to the outer circumference of the container main body 10. That is, the screw column 62*a* of the rotary member 62 and the lower screw column 66*a* of the piston type valve 66 are screw coupled together.

The operation of the two-liquid container capable of mixing the solution, which is assembled as described above, will be described below.

First, in order to mix the liquid A and liquid B, when the rotary member 62 is turned, the screw coupling of the piston-type valve 66 screw coupled to the screw column 62*a* of the rotary member 62 is released, so that the compressed cylindrical spring 67 is expanded (FIG. 7). In this way, the cylindrical spring 67 moves up the piston-type valve 66 in the cylinder member 65.

As the piston-type valve 66 moves up, the protrusion 66*c* provided on the upper surface of the piston-type valve 66 pushes the lower disk 64*c* of the opening/closing valve 64 upward, so that the lower open part of the valve support 63 is open. The liquid B flows through the space between the plurality of folding connection rods 64*e* through the lower open part, and moves up through the circular hole 64*a* of the upper disk 64*b*, so that it is mixed with the liquid A in the container main body 10.

In this way, a cosmetic liquid in which the liquid A and liquid B are mixed can be used. The first and second contents 11 and 61 can be easily mixed by rotating the rotary member 62.

Third Embodiment

Figure 9:
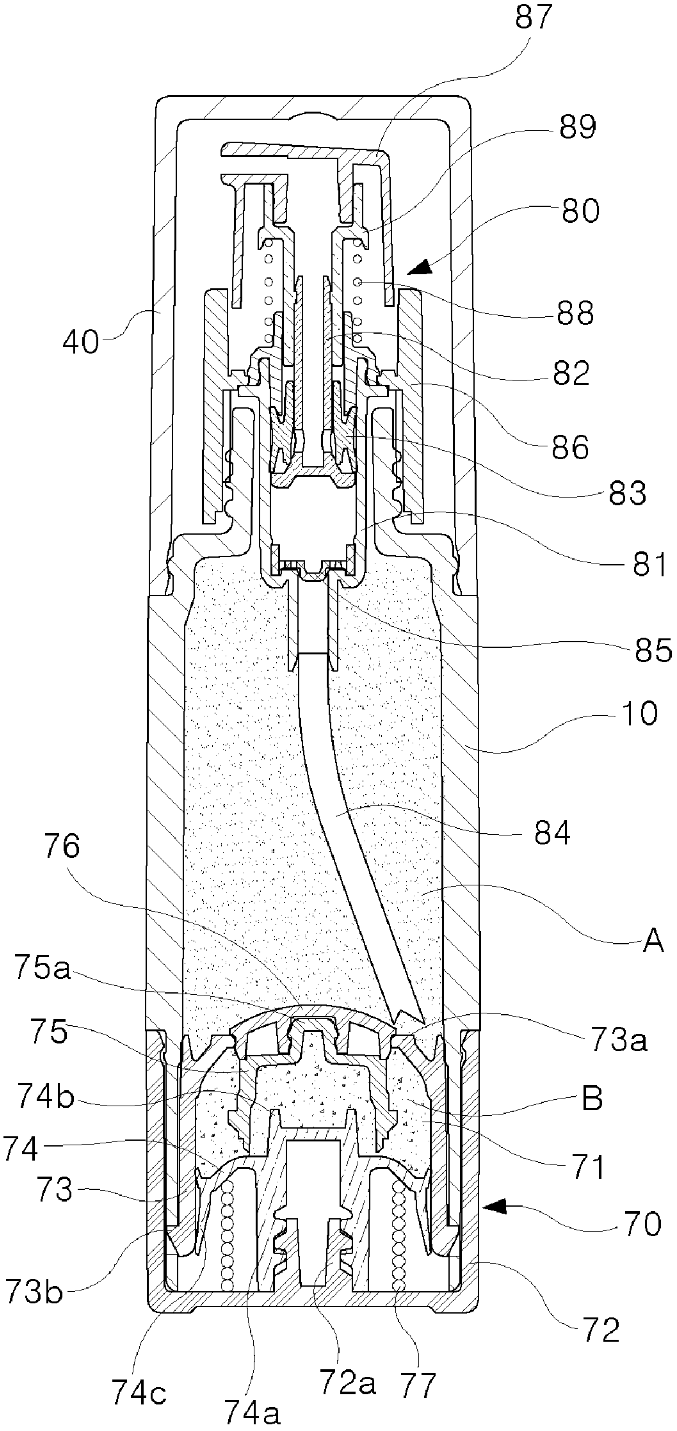
FIG. 9 is an assembled sectional view showing a two-liquid container capable of mixing a solution according to a third embodiment of the present invention.
Figure 10:
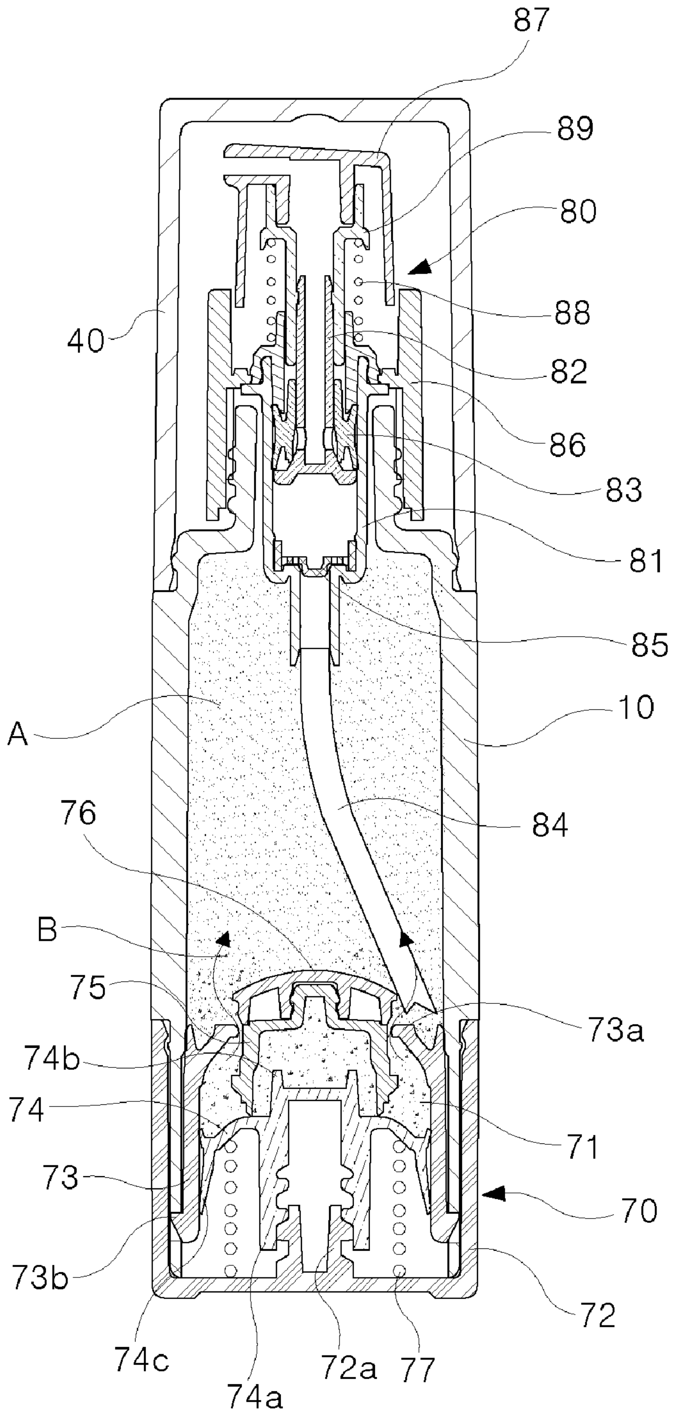
FIG. 10 is an assembled sectional view showing a state in which the two-liquid solution according to a third embodiment of the present invention is mixed.

FIG. 9 is an assembled sectional view showing a two-liquid container capable of mixing a solution according to a third embodiment of the present invention, and FIG. 10 is an assembled sectional view showing a state in which the two-liquid solution according to a third embodiment of the present invention is mixed.

As shown in FIGS. 9 and 10, the two-liquid container according to the third embodiment of the present invention is configured such that at least two types of contents are isolated before use, and then different contents are mixed when opened.

To this end, the two-liquid container may include a container main body 10 having a storage space in which an A solution that is a first content 11 is stored, and having an upper part and a lower part that are open, and a rotational assembly 70 which is coupled to the lower open part of the container main body 10 and in which a B solution that is a second content (71) is stored.

The container main body 10 may be formed at an upper portion thereof with an opening and a screw thread 12 may be formed on the outer circumferential surface of the opening.

In addition, the pump-type nozzle assembly 80 is coupled to the screw thread 12 of the container main body 10.

The pump-type nozzle assembly 80 may include a pumping cylinder 81, a pumping piston 82 installed on the upper portion of the pumping cylinder 81 and discharging the cosmetic solution to the outside by moving the cosmetic solution contained in the container main body 10 to the space of the pumping cylinder 81 by performing up and down movement, a sealing member 83, which is a member installed on the inner circumference of the pumping cylinder 81, in which the sealing member 83 moves corresponding to the up and down movement of the pumping piston 82 and seals the inside of the pumping cylinder 81 or secures a passage to allow the liquid solution contained in the pumping cylinder 81 to be discharged, a check valve 85 installed on a lower inner side of the pumping cylinder 81 to allow the liquid solution (A liquid+B liquid) contained in the container main body 10 to be sucked up into a pumping guide pipe 84, and at the same time, to allow the liquid solution contained in the pumping guide pipe 84 to be discharged to the outside without flowing back into the container main body 10 when the pumping operation is performed, a cylindrical member 86, which is a member having a cylindrical shape with upper and lower open parts coupled to the upper flange of the pumping cylinder 81, in which a female screw coupled to the screw thread of the container main body 10 is formed on the inner circumference of the cylindrical member 86, a push button 87 that moves vertically in the upper open part of the cylindrical member 86, and a coupling connection member 89 having an upper end coupled to a lower end of the push button 87, and a lower end coupled to an upper end of the pumping piston 82, and moving up and down by an elastic force of an external elastic spring 88.

The rotational assembly 70 may include: a rotary member 72, which is a cylindrical member with an upper part that is open and a lower part that is closed, rotatably coupled to an outer circumferential surface of the lower open part of the container main body 10, and having a cylindrical screw column 72*a* protruding from a center of a lower surface of the rotary member 72;

a cylinder-type valve support member 73, which is a cylindrical member with upper and lower parts that are open, in which a valve support protrusion 73*a* is formed on an upper end thereof, and an outer protrusion 73*b* is formed at a lower end thereof and inserted into a lower inner circumferential hole 13 of the container main body 10;

a piston-type valve 74, which is a disk-shaped member that moves upward from an inner circumferential portion of the cylinder-type valve support member 73 so that the B solution and the A solution contained therein are mixed and has a lower screw column 74*a* screw-coupled to the screw column 72*a* of the rotary member 72;

a cover valve 76, which is a member with an upper portion having a convex dome-shape coupled to the valve support protrusion 73*a* of the cylinder-type valve support member 73, in which cover valve 76 covers an upper portion of the cylinder-type valve support member 73;

a cover valve connector 75, in which an upper central protrusion 75*a* is coupled to a lower end of the cover valve 76, and a plurality of vertical legs are formed at a lower portion of the cover valve so that the cover valve 76 is separated from the valve support protrusion 73*a* by the cover valve connector 75 as the piston-type valve 74 moves up; and a cylindrical spring 77 inserted into a lower portion of the piston-type valve 74 and expanded when a screw coupling between the cylindrical screw column 72*a* and the lower screw column 74*a* of the piston-type valve 74 is released to push the piston-type valve 74 upward.

The piston-type valve 74 may include: a plurality of projections (74*b*) that protrude from an upper surface of the piston-type valve 74; and a side plate 74*c* formed on an outer circumference of the piston-type valve 74 in close contact with an inner circumference of the cylinder-type valve support member 73 to push up the liquid B provided thereon.

Hereinafter, the assembling process of the third embodiment of the present invention configured as described above will be described.

First, the assembling process of the rotational assembly 70 will be described. The piston-type valve 74 is firstly inserted into the inner circumference of the cylinder-type valve support member 73, and the upper surface of the piston-type valve 74 is filled with the second contents 71, that is the liquid B. Then, the cover valve 76 is inserted into the valve support protrusion 73*a* of the cylinder-type valve support member 73.

The cover valve 76 may be or may not be connected to the lower end of the cover valve connector 75.

The assembly, which is assembled as described above, is pushed upward through the lower open part of the container main body 10, and the cylindrical spring 77 is positioned at the lower portion of the piston-type valve 74. Then, the rotary member 72 is coupled to the lower outer circumference of the container main body 10. That is, the screw column 72*a* of the rotary member 72 and the lower screw column 74*a* of the piston type valve 74 are screw coupled together.

The operation of the two-liquid container capable of mixing the solution, which is assembled as described above, will be described below.

First, in order to mix the liquid A and liquid B, when the rotary member 72 is turned, the screw coupling of the piston-type valve 74 screw coupled to the screw column 72*a* of the rotary member 72 is released, so that the compressed cylindrical spring 77 is expanded (FIG. 10). In this way, the cylindrical spring 77 moves up the piston-type valve 74 in the cylinder-type valve support member 73.

As the piston-type valve 74 moves up, the upper surface of the piston-type valve 74 pushes the cover valve connector 75 upward, so that the cover valve 76 is separated from the valve support protrusion 73*a* of the cylinder-type valve support member 73. Thus, the upper open part of the cylinder-type valve support member 73 is open. The liquid B is mixed with the liquid A in the container main body 10 through the upper open part.

In this way, a cosmetic liquid in which the liquid A and liquid B are mixed can be used. The first and second contents 11 and 71 can be easily mixed by rotating the rotary member 72.

As described above, although specific embodiments have been described in the detailed description of the present invention, it is apparent that the technology of the present invention can be easily modified by those skilled in the art, and these modified embodiments may fall within the range of the technical idea of the present invention defined in the claims.

INDUSTRIAL APPLICABILITY

According to the two-liquid container of the present invention, the rotational assembly containing second contents is coupled to a lower end of the container main body containing first contents, so that first and second contents can be easily mixed by rotation of the rotational assembly.

The invention claimed is:

1. A two-liquid container comprising: a container main body (10) having a storage space in which first contents (11) are stored, and having an upper part and a lower part that are open; a rotational assembly (60) which is coupled to the lower open part of the container main body (10) and in which second contents (61) are stored; and a pipette assembly (30) screw-coupled to a screw thread (12) formed on an outer circumferential surface of the upper open part of the container main body (10), wherein the rotational assembly (60) includes:

a rotary member (62), which is a cylindrical member with an upper part that is open and a lower part that is closed, rotatably coupled to an outer circumferential surface of the lower open part of the container main body (10), and having a cylindrical screw column (62*a*) protruding from a center of a lower surface of the rotary member (62);

a valve support (63), which is a cylindrical member with upper and lower parts that are open, closely coupled to a lower inner circumferential surface of the container main body (10);

an opening/closing valve (64) mounted on the upper and lower open parts of the valve support (63);

a cylinder member (65) which is a cylindrical member having upper and lower parts that are open, in which an upper end of the cylinder member (65) closely makes contact with an outer portion of a lower end of the valve support (63), and an outer protrusion (65*a*) formed at a lower end of the cylinder member (65) is inserted into a lower inner circumferential hole (13) of the container main body (10);

a piston-type valve (66), which is a disk-shaped member that opens the opening/closing valve (64) while moving upward from an inner circumferential portion of the cylinder member (65) so that a B solution and an A solution are mixed and has a lower screw column (66*a*) screw-coupled to the screw column (62*a*) of the rotary member (62); and a cylindrical spring (67) inserted into a lower portion of the piston-type valve (66) and expanded when a screw coupling between the cylindrical screw column (62*a*) and the lower screw column (66*a*) of the piston-type valve (66) is released to push the piston-type valve (66) upward, and wherein the opening/closing valve (64) includes:

an upper disk (64*b*) seated and fixed on the upper open part of the valve support (63) and formed at a center thereof with a circular hole (64*a*);

a lower disk (64*c*) placed on an upper surface of the lower open part of the valve support (63); and a plurality of folding connection rods (64*e*), which are a plurality of members formed at equal intervals to connect between the upper disk (64*b*) and the lower disk (64*c*), in which the folding connection rods (64*e*) are formed with folded portions (64*d*), respectively, which are folded when the lower disk (64*c*) moves up.

2. The two-liquid container of claim 1, wherein the piston-type valve (66) includes: a plurality of protrusions (66*b*) formed on an upper surface of the piston-type valve (66) to push up the lower disk (64*c*) of the opening/closing valve (62) when the piston-type valve (66) moves up; and a side plate (66*c*) formed on an outer circumference of the piston-type valve (66) in close contact with an inner circumference of the cylinder member (65) to push up the liquid B provided thereon.

3. A two-liquid container comprising: a container main body (10) having a storage space in which an A solution that is a first content (11) is stored, and having an upper part and a lower part that are open; a rotational assembly (70) which is coupled to the lower open part of the container main body (10) and in which a B solution that is a second content (71) is stored; and a pump-type nozzle assembly (80) screw-coupled to a screw thread (12) formed on an outer circumferential surface of the upper open part of the container main body (10), wherein the rotational assembly (70) includes:

a rotary member (72), which is a cylindrical member with an upper part that is open and a lower part that is closed, rotatably coupled to an outer circumferential surface of the lower open part of the container main body (10), and having a cylindrical screw column (72*a*) protruding from a center of a lower surface of the rotary member (72);

a cylinder-type valve support member (73), which is a cylindrical member with upper and lower parts that are open, in which a valve support protrusion (73*a*) is formed on an upper end thereof, and an outer protrusion (73*b*) is formed at a lower end thereof and inserted into a lower inner circumferential hole (13) of the container main body (10);

a piston-type valve (74), which is a disk-shaped member that moves upward from an inner circumferential portion of the cylinder-type valve support member (73) so that the B solution and the A solution contained therein are mixed and has a lower screw column (74*a*) screw-coupled to the screw column (72*a*) of the rotary member (72);

a cover valve (76), which is a member with an upper portion having a convex dome-shape coupled to the valve support protrusion (73*a*) of the cylinder-type valve support member (73), in which cover valve (76) covers an upper portion of the cylinder-type valve support member (73); and a cylindrical spring (77) inserted into a lower portion of the piston-type valve (74) and expanded when a screw coupling between the cylindrical screw column (72*a*) and the lower screw column (74*a*) of the piston-type valve (74) is released to push the piston-type valve (74) upward, and wherein the rotational assembly (70) further includes a cover valve connector (75), in which an upper central protrusion (75*a*) is coupled to a lower end of the cover valve (76), and a plurality of vertical legs are formed at a lower portion of the cover valve so that the cover valve (76) is separated from the valve support protrusion (73*a*) by the cover valve connector (75) as the piston-type valve (74) moves up.

4. A two-liquid container comprising: a container main body (10) having a storage space in which first contents (11) are stored, and having an upper part and a lower part that are open; a rotational assembly (60) which is coupled to the lower open part of the container main body (10) and in which second contents (61) are stored; and a pipette assembly (30) screw-coupled to a screw thread (12) formed on an outer circumferential surface of the upper open part of the container main body (10), wherein the rotational assembly (60) includes:

a rotary member (62), which is a cylindrical member with an upper part that is open and a lower part that is closed, rotatably coupled to an outer circumferential surface of the lower open part of the container main body (10), and having a cylindrical screw column (62*a*) protruding from a center of a lower surface of the rotary member (62);

a valve support (63), which is a cylindrical member with upper and lower parts that are open, closely coupled to a lower inner circumferential surface of the container main body (10);

an opening/closing valve (64) mounted on the upper and lower open parts of the valve support (63);

a cylinder member (65) which is a cylindrical member having upper and lower parts that are open, in which an upper end of the cylinder member (65) closely makes contact with an outer portion of a lower end of the valve support (63), and an outer protrusion (65*a*) formed at a lower end of the cylinder member (65) is inserted into a lower inner circumferential hole (13) of the container main body (10);

a piston-type valve (66), which is a disk-shaped member that opens the opening/closing valve (64) while moving upward from an inner circumferential portion of the cylinder member (65) so that the B solution and the A solution are mixed and has a lower screw column (66*a*) screw-coupled to the screw column (62*a*) of the rotary member (62); and a cylindrical spring (67) inserted into a lower portion of the piston-type valve (66) and expanded when a screw coupling between the cylindrical screw column (62*a*) and the lower screw column (66*a*) of the piston-type valve (66) is released to push the piston-type valve (66) upward, wherein the piston-type valve (66) includes: a plurality of protrusions (66*b*) formed on an upper surface of the piston-type valve (66) to push up a lower disk (64*c*) of the opening/closing valve (62) when the piston-type valve (66) moves up; and a side plate (66*c*) formed on an outer circumference of the piston-type valve (66) in close contact with an inner circumference of the cylinder member (65) to push up the liquid B provided thereon.

5. A two-liquid container comprising: a container main body (10) having a storage space in which an A solution that is a first content (11) is stored, and having an upper part and a lower part that are open; a rotational assembly (70) which is coupled to the lower open part of the container main body (10) and in which a B solution that is a second content (71) is stored; and a pump-type nozzle assembly (80) screw-coupled to a screw thread (12) formed on an outer circumferential surface of the upper open part of the container main body (10), wherein the rotational assembly (70) includes:

a rotary member (72), which is a cylindrical member with an upper part that is open and a lower part that is closed, rotatably coupled to an outer circumferential surface of the lower open part of the container main body (10), and having a cylindrical screw column (72*a*) protruding from a center of a lower surface of the rotary member (72);

a cylinder-type valve support member (73), which is a cylindrical member with upper and lower parts that are open, in which a valve support protrusion (73*a*) is formed on an upper end thereof, and an outer protrusion (73*b*) is formed at a lower end thereof and inserted into a lower inner circumferential hole (13) of the container main body (10);

a piston-type valve (74), which is a disk-shaped member that moves upward from an inner circumferential portion of the cylinder-type valve support member (73) so that the B solution and the A solution contained therein are mixed and has a lower screw column (74*a*) screw-coupled to the screw column (72*a*) of the rotary member (72);

a cover valve (76), which is a member with an upper portion having a convex dome-shape coupled to the valve support protrusion (73*a*) of the cylinder-type valve support member (73), in which cover valve (76) covers an upper portion of the cylinder-type valve support member (73); and a cylindrical spring (77) inserted into a lower portion of the piston-type valve (74) and expanded when a screw coupling between the cylindrical screw column (72*a*) and the lower screw column (74*a*) of the piston-type valve (74) is released to push the piston-type valve (74) upward, wherein the piston-type valve (74) includes: a plurality of projections (74*b*) that protrude from an upper surface of the piston-type valve (74) to push up a lower end of the cover valve (76) when the piston-type valve (74) moves up; and a side plate (74*c*) formed on an outer circumference of the piston-type valve (74) in close contact with an inner circumference of the cylinder-type valve support member (73) to push up the liquid B provided thereon.

* * * * *